United States Patent
Bailey

(10) Patent No.: US 10,879,655 B2
(45) Date of Patent: Dec. 29, 2020

(54) IN-HOME NETWORK SPLITTER WITH REDUCED ISOLATION

(71) Applicant: PPC BROADBAND, INC., East Syracuse, NY (US)

(72) Inventor: Paul Bailey, Camillus, NY (US)

(73) Assignee: PPC BROADBAND, INC., East Syracuse, NY (US)

( * ) Notice: Subject to any disclaimer, the term of this patent is extended or adjusted under 35 U.S.C. 154(b) by 32 days.

(21) Appl. No.: 16/248,152

(22) Filed: Jan. 15, 2019

(65) Prior Publication Data
US 2019/0221974 A1    Jul. 18, 2019

Related U.S. Application Data

(60) Provisional application No. 62/675,986, filed on May 24, 2018, provisional application No. 62/618,204, filed on Jan. 17, 2018.

(51) Int. Cl.
| | | |
|---|---|---|
| *H01R 24/54* | (2011.01) | |
| *H04N 7/10* | (2006.01) | |
| *H01R 13/719* | (2011.01) | |

(52) U.S. Cl.
CPC ......... *H01R 24/547* (2013.01); *H01R 13/719* (2013.01); *H01R 24/542* (2013.01);
(Continued)

(58) Field of Classification Search
CPC .. H01R 24/547; H01R 24/542; H01R 13/719; H01R 2200/04; H01R 2201/18; H04N 7/104; H01P 5/12
(Continued)

(56) References Cited

U.S. PATENT DOCUMENTS

| | | | | |
|---|---|---|---|---|
| 4,547,745 | A | * | 10/1985 | Freitag ...................... H01P 5/16 330/286 |
| 8,752,114 | B1 | | 6/2014 | Shapson et al. |

(Continued)

OTHER PUBLICATIONS

Gallo, A., "Basics of RF Electronics", CERN Yellow Report CERN-2011-007, pp. 223-275, Dec. 14, 2011, Published Online, https://arxiv.org/abs/1112.3226, figures 7-10, section 5, pp. 6-7.

(Continued)

*Primary Examiner* — Robert J Pascal
*Assistant Examiner* — Kimberly E Glenn
(74) *Attorney, Agent, or Firm* — MH2 Technology Law Group LLP

(57) ABSTRACT

A splitter for use in an in-home network includes an input and a plurality of outputs including at least a first output and a second output. A split point is between the input and the plurality of outputs. A first resistor and a first capacitor are connected in series between the input and the split point. A second resistor and a second capacitor are connected in series between the split point and the first output. A third resistor and a third capacitor are connected in series between the split point and the second output. The input, the first output, and the second output form a resistive Wye-type splitter. A first path exists between the input and the first output. A second path exists between the input and the second output. The first path and the second path have a substantially equal series resistance, series impedance, insertion loss, and isolation.

66 Claims, 5 Drawing Sheets

(52) U.S. Cl.
CPC ......... *H04N 7/104* (2013.01); *H01R 2201/04* (2013.01); *H01R 2201/18* (2013.01)

(58) Field of Classification Search
USPC .......................................................... 333/130
See application file for complete search history.

(56) References Cited

U.S. PATENT DOCUMENTS

| | | |
|---|---|---|
| 9,516,376 B2 | 12/2016 | Wells et al. |
| 2010/0100918 A1 | 4/2010 | Egan, Jr. et al. |
| 2018/0007318 A1 | 1/2018 | Bailey et al. |

OTHER PUBLICATIONS

Mini-Circuits, "Understanding Power Splitters", Apr. 15, 2015, Published Online, https://www.minicircuits.com/app/AN10-006.pdf, p. 1.

Ness Engineering, "Splitter/Adder Equations and Calculator", Jun. 5, 2006, Published Online, http://www.nessengr.com/technical-data/splitter-adder-equations-and-calculator/, p. 1.

Shane Thomas (Authorized Officer), International Search Report and Written Opinion dated Apr. 1, 2019, PCT Application No. PCT/US2019/013629, pp. 1-10.

Holland Electronics, LLC GHPNA 2 Specification Sheet Mar. 1, 2015 Holland Electronics, LLC http://www.hollandelectronics.com/catalog/upload_file/ GHPNA-Splitters.pdf.

Holland Electronics, LLC Specialty Splitters Mar. 1, 2015 Holland Electronics, LLC http://www.hollandelectronics.com/catalog/catalog.php?product_id=COAXIAL-HPNA-Splitter.†

Holland Electronics, LLC GHPNA-2 Circuit Diagram May 1, 2008 Holland Electronics, LLC Various Commercial Company Sites.†

Holland Electronics, LLC Designed to Work Specifically in HPNA Environments Mar. 1, 2015 Holland Electronics, LLC http://www.hollandelectronics.com/catalog/upload_file/GHPNA-Splitters.pdf.†

Holland Electronics, LLC GHPNA 2 Specification Sheet1 Mar. 2015 Holland Electronics, LLC http://www.hollandelectronics.com/catalog/upload_file/GHPNA-Splitters.pdf.†

\* cited by examiner
† cited by third party

IN-HOME NETWORK SPLITTER WITH REDUCED ISOLATION

CROSS-REFERENCE TO RELATED APPLICATIONS

This application claims priority to U.S. Provisional Patent Application No. 62/618,204, filed on Jan. 17, 2018, and U.S. Provisional Patent Application No. 62/675,986, filed on May 24, 2018. The entirety of both applications is incorporated by reference herein.

BACKGROUND

Typical legacy splitters or power dividers that are used in cable television (CATV) and multimedia over coax alliance (MoCA) networks have predominantly used ferrite transformers to provide a broadband circuit with low input-to-output loss and high output-to-output isolation. These ferrite core splitter circuits are structured in many different ways to include core shape, size, material, winding scheme, external components and additional intermediate circuits to achieve acceptable in-home performance for the CATV bandwidth (e.g., 5-1002 MHz) and MoCA bandwidth (e.g., 1125-1675 MHz). In such ferrite core splitters, however, the extension of bandwidth and/or the addition of intermediate circuits both increase input-to-output losses and may result in high isolation or notches in the output-to-output MoCA band which may cause a loss of in-band signals. Therefore, it would be desirable to have a new splitter to overcome these drawbacks.

SUMMARY

A splitter for use in an in-home network is disclosed. The splitter includes an input and a plurality of outputs including at least a first output and a second output. A split point is between the input and the plurality of outputs. A first resistor and a first capacitor are connected in series between the input and the split point. A second resistor and a second capacitor are connected in series between the split point and the first output. A third resistor and a third capacitor are connected in series between the split point and the second output. The input, the first output, and the second output form a resistive Wye-type splitter. A first path exists between the input and the first output. A second path exists between the input and the second output. The first path and the second path have a substantially equal series resistance. The first path and the second path have a substantially equal series impedance. The first path and the second path have a substantially equivalent insertion loss. The first path and the second path have a substantially equivalent isolation. The splitter is band-limited between about 1125 MHz and about 1675 MHz.

In another embodiment, the splitter includes an input and a plurality of outputs including at least a first output and a second output. The input, the first output, and the second output form a resistive Wye-type splitter. A first path exists between the input and the first output. A second path exists between the input and the second output. The first path and the second path have a substantially equal series resistance. The first path and the second path have a substantially equivalent insertion loss. The first path and the second path have a substantially equivalent isolation.

In another embodiment, the splitter includes an input and a plurality of outputs including at least a first output and a second output. The input, the first output, and the second output form a resistive Wye-type splitter. A first path exists between the input and the first output. A second path exists between the input and the second output. The first path and the second path have a substantially equal series resistance. The first path and the second path have a substantially equivalent insertion loss. The first path and the second path have a substantially equivalent isolation. The splitter does not comprise ferrite. The isolation is less than 20 dB when the number of outputs is between two and eight.

It will be appreciated that this summary is intended merely to introduce some aspects of the present methods, systems, and media, which are more fully described and/or claimed below. Accordingly, this summary is not intended to be limiting.

BRIEF DESCRIPTION OF THE DRAWINGS

The accompanying drawings, which are incorporated in and constitute a part of this specification, illustrate embodiments of the present teachings and together with the description, serve to explain the principles of the present teachings.

DETAILED DESCRIPTION

Figure 1:
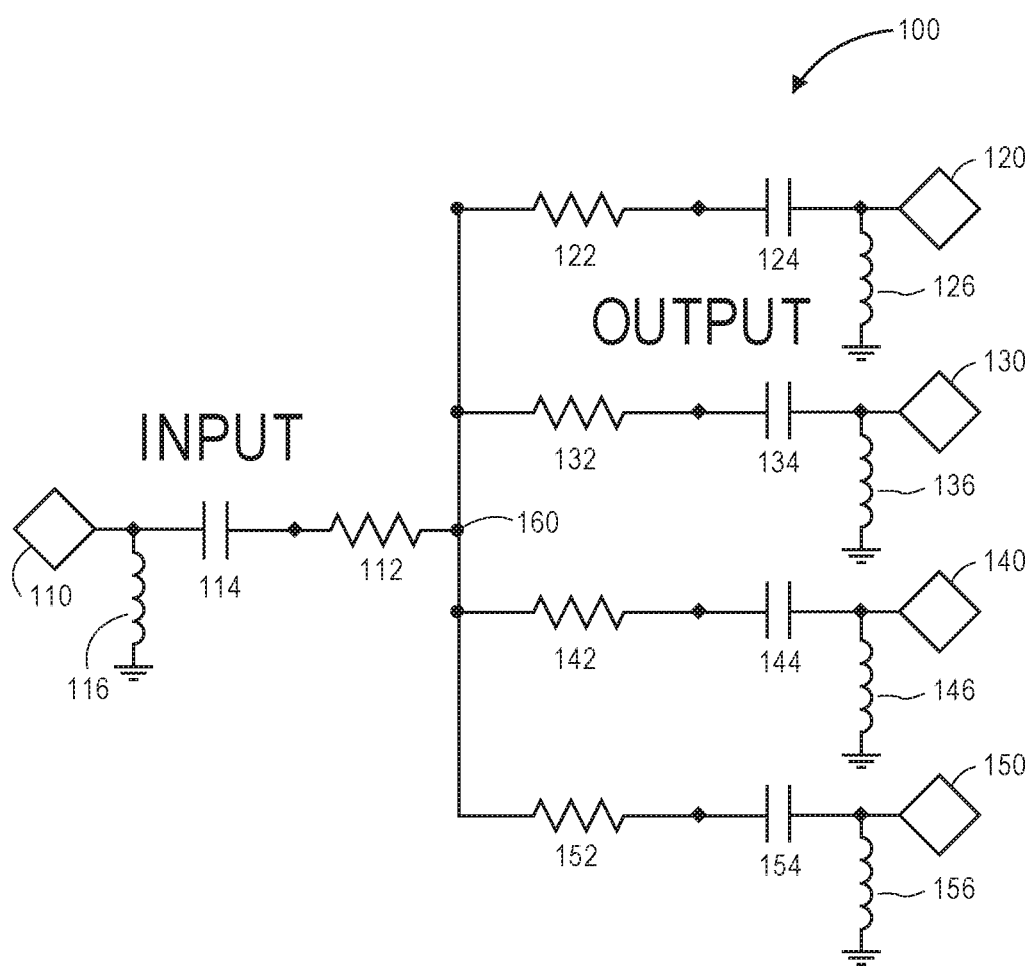
FIG. 1 illustrates a schematic view of an in-home network splitter, according to an embodiment.

Embodiments of the present disclosure may provide an in-home network resistive splitter that has an applied band-limitation (e.g., to 1125-1675 MHz), which allows for the alternative circuit design for improved in-home or MoCA band radio-frequency (RF) performance, thereby differing from conventional broadband CATV splitters. Resistive splitters are not typically used in CATV applications due to their high input-to-output insertion loss and low output isolation compared to conventional ferrite core splitters. Currently, the telecom industry and CATV operators are transitioning from a combined full access and MoCA network architecture to a semi-isolated in-home network architecture, which may benefit from the resistive splitters disclosed herein. As used herein, a full access and MoCA network allows all equipment to access the outside CATV distribution Network or CMTS (e.g., head end) while a semi-isolated in-home network architecture refers to a network including a combination of access and non-access equipment, where the access equipment (e.g., such as modems, gateways and DVRs) has access outside the home, and the non-access equipment such as set top boxes are 100% isolated within the home and coupled only to the access equipment via the in-home or MoCA band. The functionality of the resistive splitters may be further improved with the addition of supporting adaptor circuits that improve the coupling between different networks such as CATV and MoCA, or provide DC blocking, lightning (e.g., surge/ESD) protection, or low-frequency noise ingress mitigation. The resistive splitters may be cascaded in series as-is, or provided with modifications to the resistive splitters, where the input port resistor is decreased or removed, thereby decreasing through-loss by as much as 2 dB.

Non-ferrite splitter architectures within the MoCA-only network can improve the quality of the MoCA band performance. The resistive splitter has about the same input-to-output insertion loss as the ferrite splitter, but it has less output-to-output isolation that is substantially flatter, making it a good fit for use within the MoCA-only network. This structure can increase the output port count while sustaining improved in-band flatness. For example, a resistive splitter with 12 outputs has less than 22 dB of output isolation, which is roughly the same as a 2-output ferrite splitter. Thus, the resistive splitter disclosed herein may improve the split count and MoCA in-band quality.

The resistive splitter may be an in-home-network-only splitter with reduced isolation between the outputs. The resistive splitter may be a resistive Wye-type splitter where $R=Zo(N-1)/(N+1)$, where R=resistance, Zo=impedance, and N=the number of matched outputs. The resistive Wye-type splitter may be selected over the delta-type splitter because it can more easily be adapted to an N-way splitter configuration. Each path of the Wye-type N-port circuit (e.g., from the input to any output or from any output to any other output) may have a series resistance of substantially equal value. Each path of the Wye-type N-port circuit may have a substantially equivalent insertion loss and/or isolation. The resistive splitter can be deployed anywhere within the in-home network to provide extended quantity of premises equipment outputs. The resistive splitter may have a substantially flat passband response. The resistive splitter may have better passive intermodulation (PIM) performance than the conventional non-linear ferrite splitter. The resistive splitter containing high-pass noise mitigating or surge and esd protection may use a reflection-less in-home network adapter (RNA) when coupled to a CATV access network device to prevent CATV interference signals from being reflected back into the CATV network. In the MoCA band input-to-output, insertion loss is substantially equal for both resistive splitters and ferrite splitters. However, in the MoCA band, input-to-output isolation is different between resistive splitters and ferrite splitters. More particularly, ferrite splitters have excessive isolation beyond 6 splits and may require secondary circuits such as diplex bridging to achieve a functional in-home (e.g., MoCA) network, whereas resistive splitters can provide 25 or more splits before nearing a functional 30 dB isolation limit in addition to providing a significantly flatter response.

FIG. 1 illustrates an in-home network splitter 100, according to an embodiment. As shown, the splitter 100 includes an input 110 and one or more outputs (four are shown: 120, 130, 140, 150). A resistor 112 and a capacitor 114 may be in series between the input 110 and a split point 160. Similarly, a resistor 122, 132, 142, 152 and a capacitor 124, 134, 144, 154 may be in series between the split point 160 and each respective output 120, 130, 140, 150. In at least one embodiment, each resistor may have substantially the same value (e.g., 45 ohms), and each capacitor may have substantially the same value (e.g., 1000 pF). In at least one embodiment, one or more of the (e.g., blocking) capacitors may be omitted.

The splitter 100 may be or include a resistive 4-way Wye splitter with DC block caps at the ports. In an example, for Zo=75 ohm and N=4; $R=Zo*(N+1)/(N-1)=45$ ohm. The splitter 100 may be used in one or more of the applications described in U.S. patent application Ser. No. 15/638,933, which is incorporated herein by reference. In at least one embodiment, shunt chokes or coils 116, 126, 136, 146, 156 may be added to further improve the DC blocking, surge suppression, and/or noise mitigation.

Figure 2A:
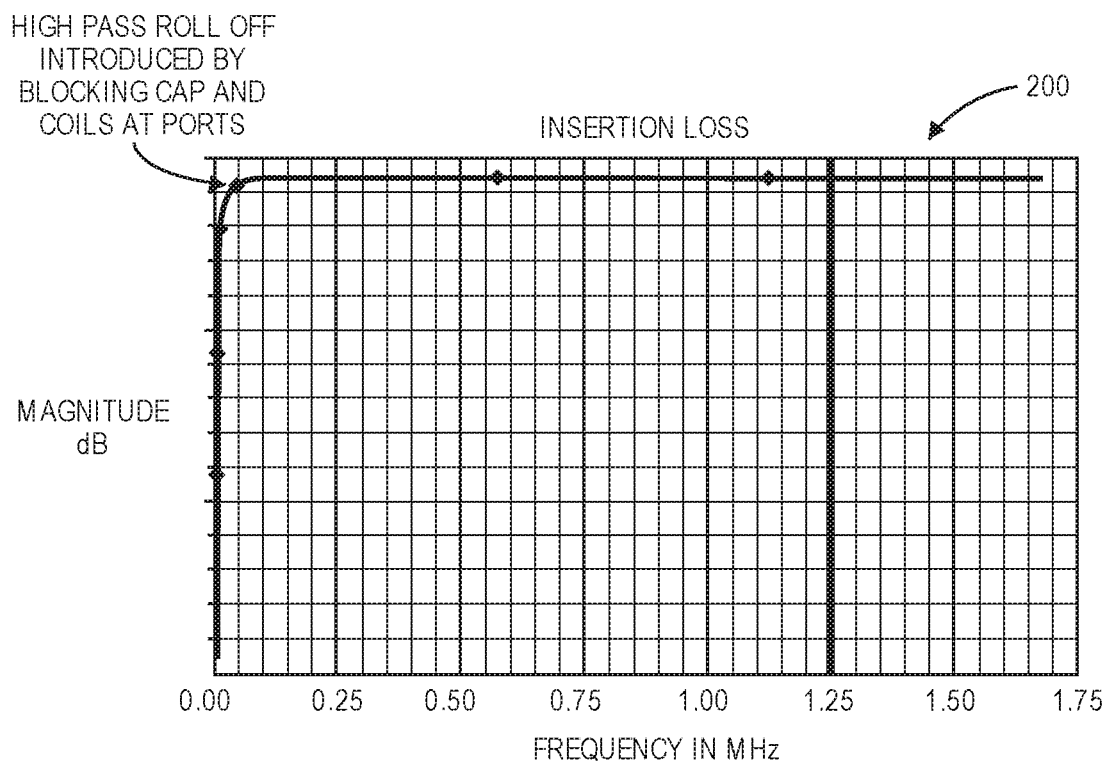
FIG. 2A illustrates a graph showing isolation and insertion loss for an equal-output 4-way Wye resistive splitter, according to an embodiment.

FIG. 2A illustrates a graph 200 showing insertion loss and isolation for the equal-output 4-way Wye resistive splitter 100, according to an embodiment. The X-axis is frequency in MHz, and the Y-axis is magnitude in dB. In a symmetric or balanced design, the insertion loss is substantially equivalent to the isolation at/in all paths. The input-to-output insertion loss (e.g., S12, S13, S14 . . . )=12 dB at 1125-1675 MHz. The output-to-output isolation (e.g., from output 120 to output 130, from output 130 to output 140, and/or from output 140 to output 150)=12 dB at 1125-1675 MHz. The insertion loss and isolation are substantially overlapping in the graph 200.

Balanced wye-type resistive splitters are symmetrical in design. Thus, their insertion loss and isolation are the same parameter and represent the magnitude of loss between any two ports. In some cases, the circuit may be unbalanced with differing resistance values, resulting in differing insertion loss or isolation values between various combinations of ports.

Figure 2B:
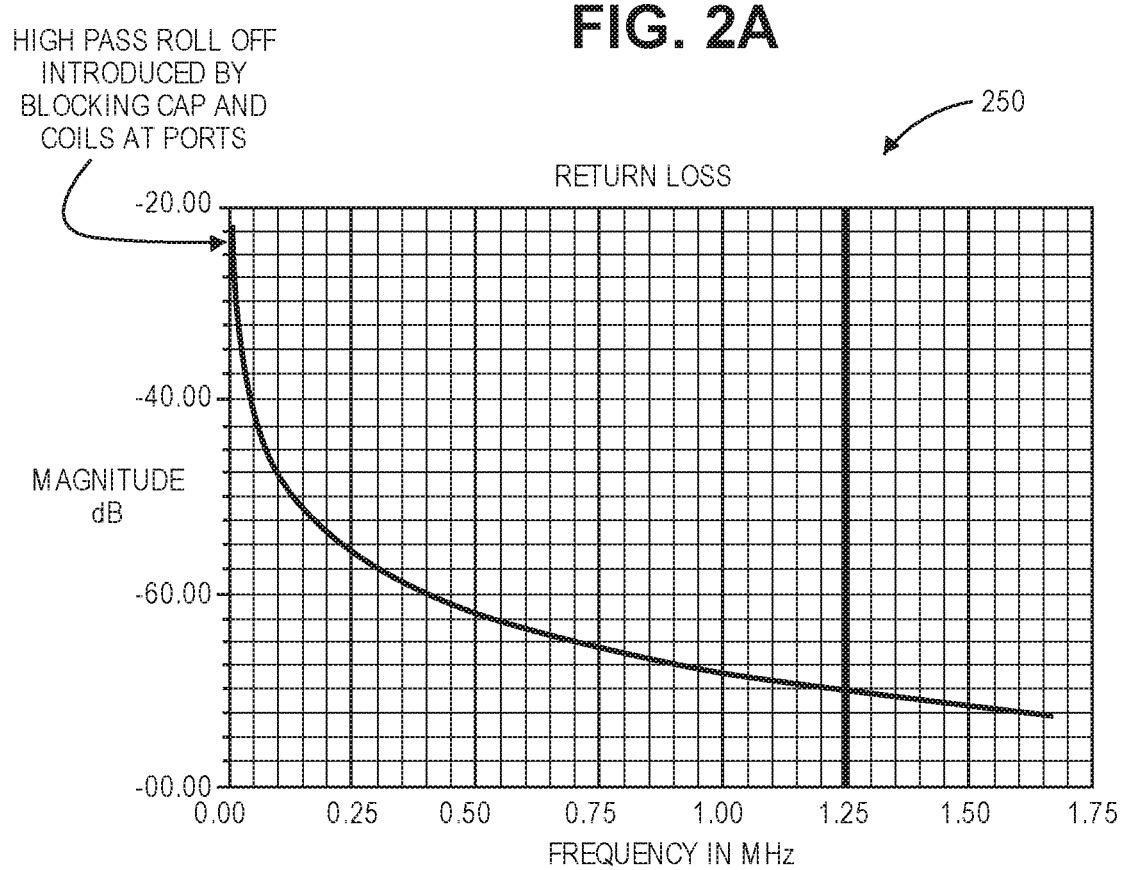
FIG. 2B illustrates a graph showing return loss for the equal-output 4-way Wye resistive splitter, according to an embodiment.

FIG. 2B illustrates a graph 250 showing return loss for the equal-output 4-way Wye resistive splitter 100, according to an embodiment. The return loss is nearly ideal, less the effect of the caps introducing a high pass roll off at low frequency. The ideal return loss for all ports (e.g., at the input 110 or any of the outputs 120, 130, 140, 150)=60 dB at 1125-1675 MHz. The reactive component or DC blocking cap is added for realism and adds curvature to the output response graphs. In at least one embodiment, the focus of the in-home network splitter response is in the MoCa band (e.g., 1125-1675 MHz). FIGS. 2A and 2B also show the high pass roll-off introduced by blocking caps and coils at the ports.

Figure 3A:
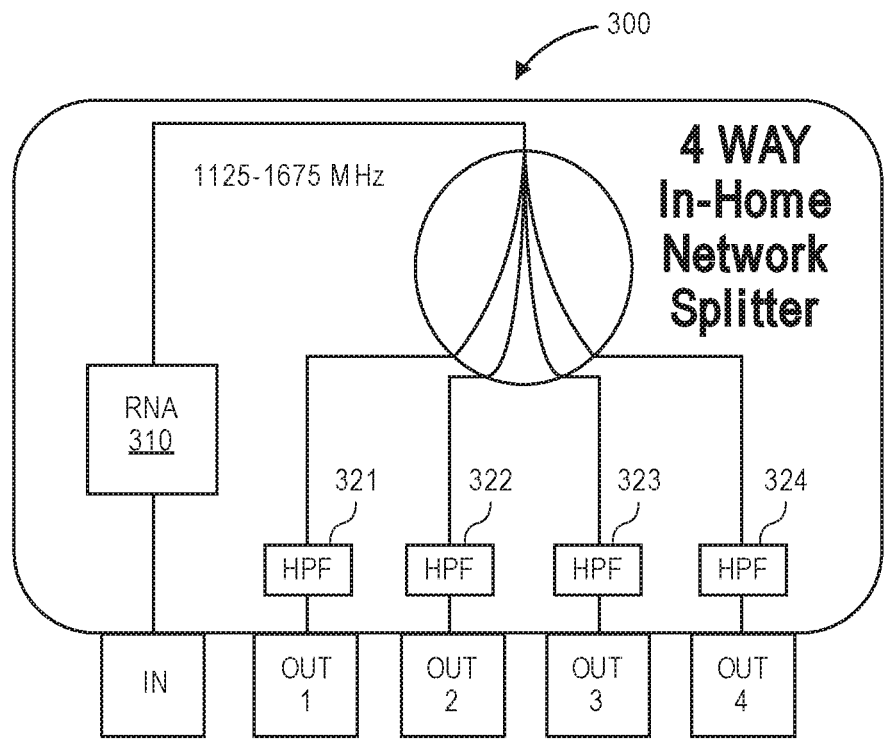
FIG. 3A illustrates a 4-way in-home network splitter (e.g., ferrite or resistive) with a reflection-less network adapter at the input and high-pass filter (HPF) elements at the output ports, according to an embodiment.
Figure 3B:
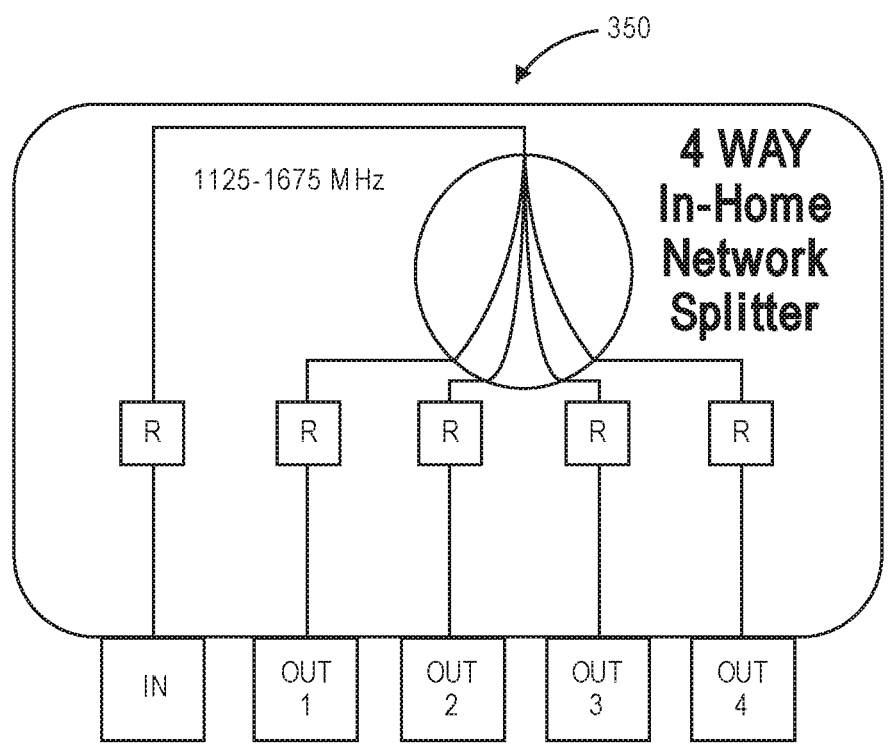
FIG. 3B illustrates a 4-way in-home network splitter that is a resistive Wye-type, according to an embodiment.

FIG. 3A illustrates a 4-way in-home network splitter 300 (e.g., ferrite or resistive) with a reflection-less network adapter 310, according to an embodiment. The adapter 310 may be deployed when the output ports are configured with high-pass elements for DC blocking, surge suppressing, and noise mitigation. High-pass filter (HPF) elements 321-324 may be connected to the output ports. The HPF elements 321-324 may be any combination of series DC blocking capacitance and shunt coils. When the HPF elements 321-324 are used, the RNA 310 may be connected to the input port to prevent reflections in the CATV bandwidth. FIG. 3B illustrates a 4-way in-home network splitter 350 that is a resistive Wye-type, according to an embodiment.

Figure 4A:
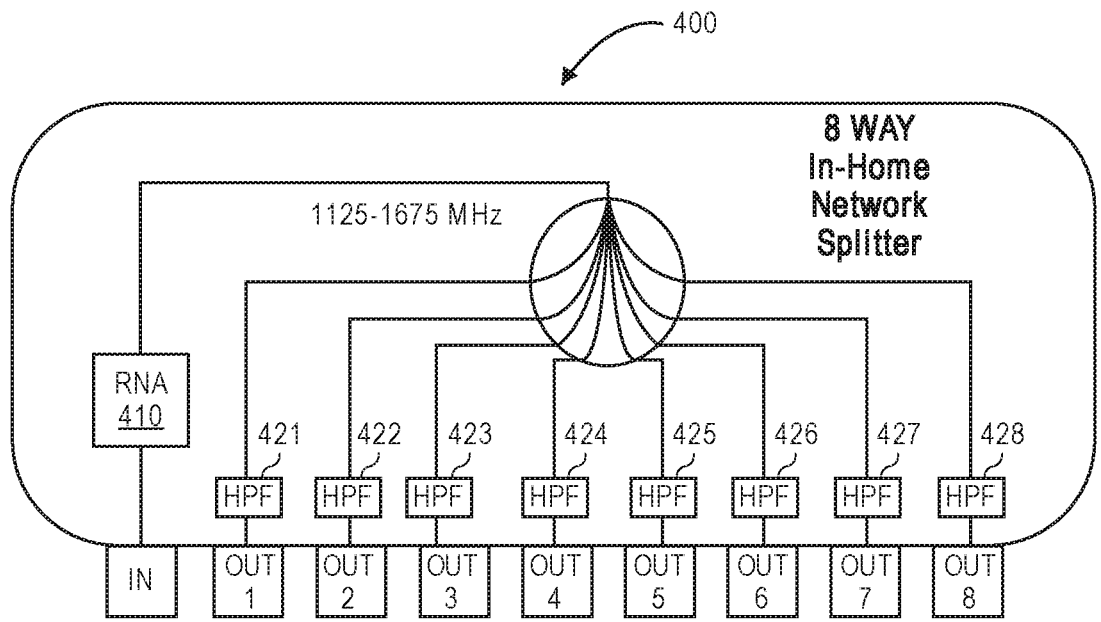
FIG. 4A illustrates an 8-way in-home network splitter with a reflection-less network adapter at the input and HPF elements at the output ports, according to an embodiment.
Figure 4B:
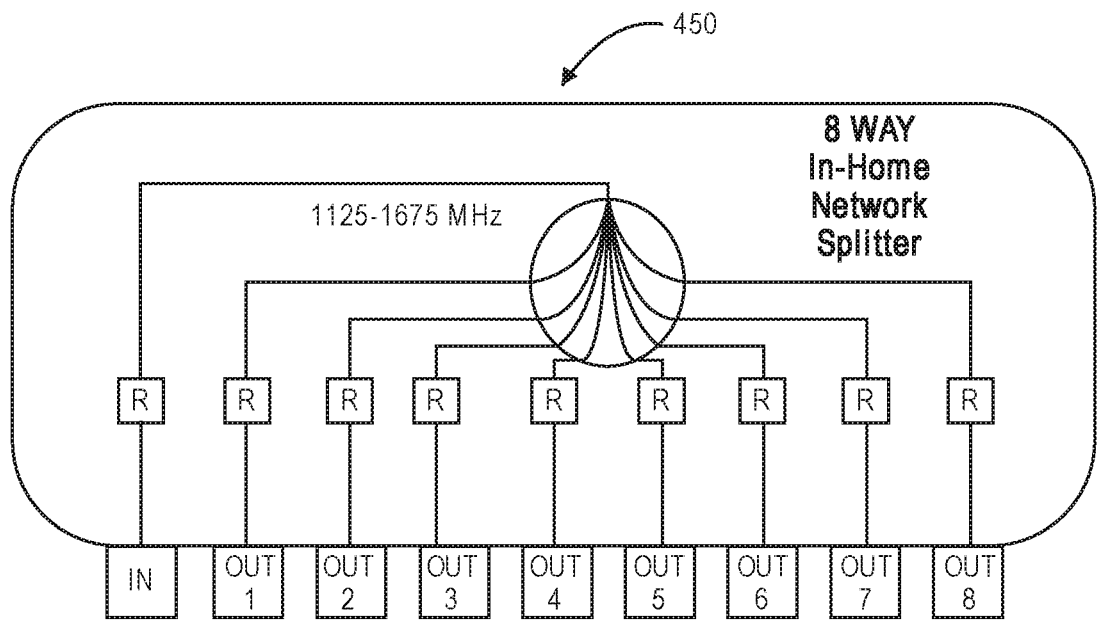
FIG. 4B illustrates an 8-way in-home network splitter with a resistive Wye network and no filters, according to an embodiment.

FIG. 4A illustrates an 8-way in-home network splitter 400 with a reflection-less network adapter (RNA) 410, according to an embodiment. The splitter 400 may be a high-pass filter for noise isolation. In at least one embodiment, low-order high-pass filters can be deployed at one or more (e.g., all) ports for surge protection and low-frequency noise ingress mitigation. High-pass filter (HPF) elements 421-428 may be connected to the output ports. The HPF elements 421-428 may be any combination of series DC blocking capacitance and shunt coils. When the HPF elements 421-428 are used, the RNA 410 should be connected to the input port to prevent reflections in the CATV bandwidth. FIG. 4B illustrates an 8-way in-home network splitter 450 with a resistive Wye network and no filters, according to an embodiment.

Figure 5:
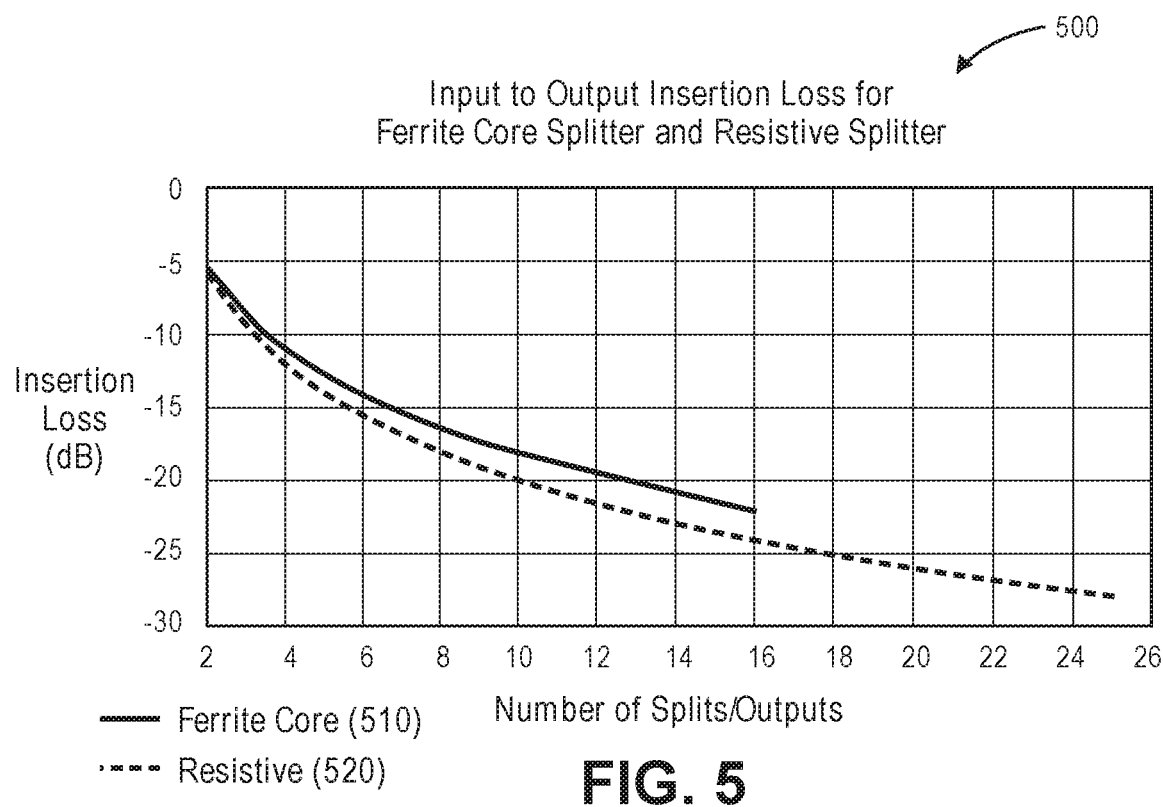
FIG. 5 illustrates a graph showing a comparison of the input-to-output insertion loss in the MoCA band (e.g., 1125-1675 MHz) for a ferrite core splitter and a resistive splitter, according to an embodiment.

FIG. 5 illustrates a graph 500 showing input-to-output insertion loss in the MoCA band (e.g., 1125-1675 MHz) for a ferrite core splitter 510 and a resistive splitter 520, according to an embodiment. In the ferrite core splitter 510, MoCA insertion loss degrades significantly. As shown, in the ferrite core splitter 510, the insertion loss is less than about 10 dB up to about 3 splits or output ports. The insertion loss drops to about 22 dB at 16 splits or output ports. In the resistive Wye splitter 520, MoCA insertion loss is less than about 30 dB up to about 20 or about 25 splits or output ports.

Figure 6:
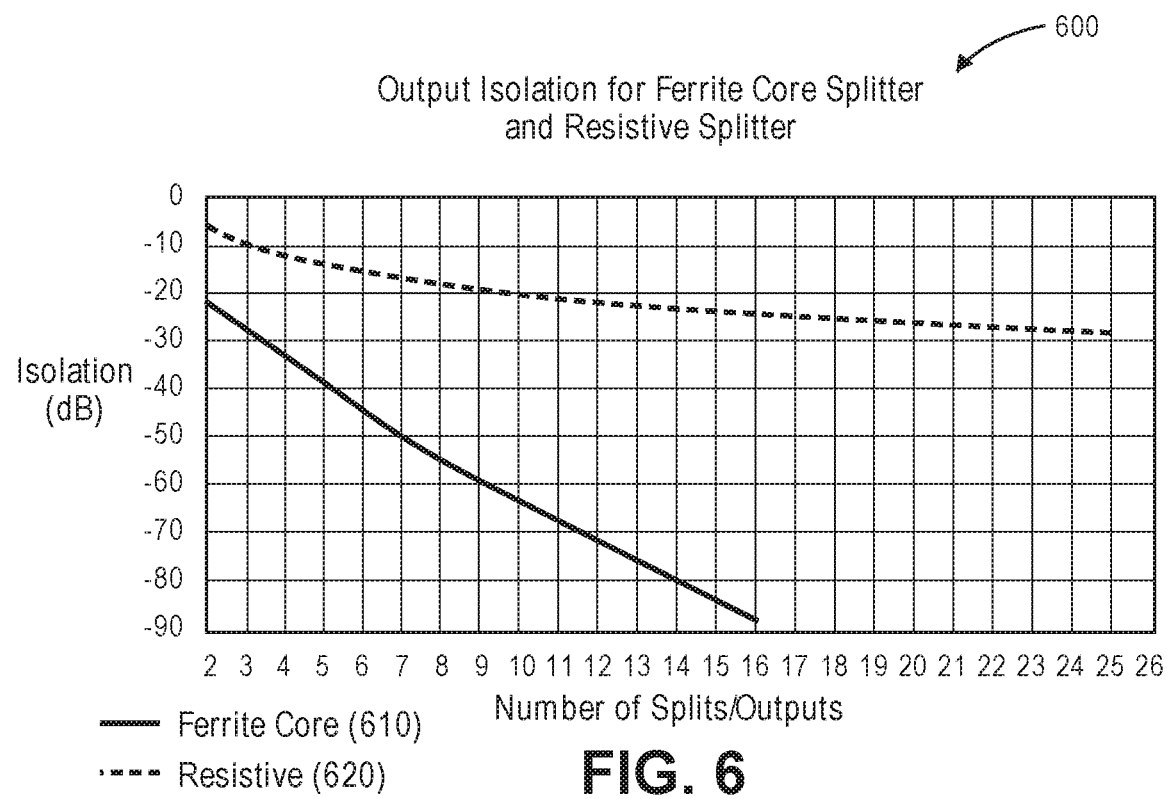
FIG. 6 illustrates a graph showing a comparison of the output-to-output isolation in the MoCA band (e.g., 1125-1675 MHz) for a ferrite core splitter and a resistive splitter, according to an embodiment.

FIG. 6 illustrates a graph 600 showing output-to-output isolation in the MoCA band (e.g., 1125-1675 MHz) for a ferrite core splitter 610 and a resistive splitter 620, according to an embodiment. In the ferrite core splitter 610, MoCA isolation degrades significantly. The conventional ferrite core splitter 610 increases in isolation as the number of outputs increases. In contrast, the resistive splitter 620 has a depreciating increase in isolation as the number of outputs increases. In other words, the isolation continues to increase as the number of outputs increases, but by smaller and smaller amounts with the addition of each output. Thus, the resistive splitter 620 may be an improved option for higher-split applications such as used within the in-home network. Although not depicted in the Figures, the in-home network splitters may utilize wire wound chokes or coils shunt to ground at the RF ports to further enhance the surge or noise ingress suppression.

As shown, in the ferrite core splitter 610, the isolation is less than about 30 dB beyond 4 splits and requires additional circuitry such as a MoCA bridging diplexers to make it functional. The isolation drops to about 90 dB at 16 splits or output ports. In the resistive splitter 620, MoCA isolation is less than about 15 dB across 4 splits or outputs, less than about 20 dB across 8 splits or outputs, less than about 25 dB across 16 splits or outputs, and less than about 30 dB across 25 splits or output ports.

Some in-home network splitters that employ shunt chokes or coils at the output ports, to enhance the low-frequency noise mitigations, surge and esd protection, may also employ a resistive network adapter at the input port to prevent reflections in the CATV band.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims. The present disclosure is not to be limited in terms of the particular embodiments described in this application, which are intended as illustrations of various aspects. Many modifications and variations can be made without departing from its spirit and scope, as will be apparent to those skilled in the art. Functionally equivalent apparatuses within the scope of the disclosure, in addition to those enumerated herein will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." In addition, where features or aspects of the disclosure are described in terms of Markush groups, those skilled in the art will recognize that the disclosure is also thereby described in terms of any individual member or subgroup of members of the Markush group.

What is claimed is:

1. A splitter for use in an in-home network, comprising:
   an input;
   a plurality of outputs including at least a first output and a second output;
   a split point between the input and the plurality of outputs;
   a first resistor and a first capacitor connected in series between the input and the split point;
   a second resistor and a second capacitor connected in series between the split point and the first output;
   a third resistor and a third capacitor connected in series between the split point and the second output;
   wherein:
   the input, the first output, and the second output form a resistive Wye-type splitter;
   a first path is configured to extend between the input and the first output;
   a second path is configured to extend between the input and the second output;
   a third path is configured to extend between the first output and the second output;
   the first path and the second path are configured to provide a substantially equal series resistance;
   the first path and the second path are configured to provide a substantially equal series impedance;
   the first path and the second path are configured to provide a substantially equivalent insertion loss;
   the third path is configured to provide an isolation that is less than 25 dB; and
   the splitter is band-limited between about 1125 MHz and about 1675 MHz.

2. The splitter of claim 1, wherein the splitter does not comprise ferrite.

3. The splitter of claim 1, wherein the insertion loss of the splitter is greater than the insertion loss of a non-linear ferrite splitter.

4. The splitter of claim 1, wherein the isolation of the splitter is less than the isolation of a non-linear ferrite splitter.

5. The splitter of claim 1, wherein the splitter has a better passive intermodulation performance than a non-linear ferrite splitter.

6. A splitter for use in an in-home network, comprising:
   an input;
   a plurality of outputs including at least a first output and a second output, wherein:
   the input, the first output, and the second output form a resistive Wye-type splitter;
   a first path is configured to extend between the input and the first output;
   a second path is configured to extend between the input and the second output;
   a third path is configured to extend between the first output and the second output;
   the first path and the second path are configured to provide a substantially equal series resistance;
   the first path and the second path are configured to provide a substantially equivalent insertion loss; and
   the third path is configured to provide an isolation that is less than 30 dB.

7. The splitter of claim 6, wherein the first path and the second path are configured to provide a substantially equal series impedance.

8. The splitter of claim 6, wherein the splitter is band-limited between about 1125 MHz and about 1675 MHz.

9. The splitter of claim 6, wherein the splitter has a depreciating increase in isolation as the number of outputs increases.

10. The splitter of claim 6, wherein $R=Z_o(N-1)/(N+1)$, and wherein R represents resistance, $Z_o$ represents impedance, and N represents a number of the outputs.

11. The splitter of claim 6, wherein the splitter is configured to provide a substantially flat passband response.

12. The splitter of claim 6, further comprising a reflection-less in-home network adapter connected in series between the input and the plurality of outputs that prevents cable television (CATV) interference signals from being reflected into a CATV network when high-pass filter elements are connected to the output ports.

13. The splitter of claim 6, wherein the number of the plurality of outputs is from two to four, and wherein the isolation in the third path is less than 15 dB.

14. The splitter of claim 6, wherein the number of the plurality of outputs is from two to sixteen, and wherein the isolation in the third path is less than 25 dB.

15. The splitter of claim 6, wherein the number of the plurality of outputs is from sixteen to twenty-four.

16. A splitter for use in an in-home network, comprising:
    an input;
    a plurality of outputs including at least a first output and a second output, wherein:
    the input, the first output, and the second output form a resistive Wye-type splitter;
    a first path is configured to extend between the input and the first output;
    a second path is configured to extend between the input and the second output;
    a third path is configured to extend between the first output and the second output;
    the first path and the second path are configured to provide a substantially equal series resistance;
    the first path and the second path are configured to provide a substantially equivalent insertion loss;
    the splitter does not comprise ferrite; and
    the third path is configured to provide an isolation that is less than 20 dB.

17. The splitter of claim 16, further comprising a reflection-less in-home network adapter connected in series between the input and the plurality of outputs that prevents cable television (CATV) interference signals from being reflected back into a CATV network.

18. The splitter of claim 16, wherein the splitter is band-limited between about 1125 MHz and about 1675 MHz.

19. The splitter of claim 16, wherein the splitter is configured to provide a substantially flat passband response.

20. The splitter of claim 16, wherein the splitter has a depreciating increase in isolation as the number of outputs increases.

21. A splitter for use in an in-home network, comprising:
    an input;
    a plurality of outputs, wherein a number of the plurality of outputs is less than or equal to twenty-four, and wherein the plurality of outputs includes at least a first output and a second output, wherein:
    the input, the first output, and the second output form a resistive Wye-type splitter;
    a first path is configured to extend between the input and the first output;

a second path is configured to extend between the input and the second output;

a third path is configured to extend between the first output and the second output;

the first path and the second path are configured to provide a substantially equal series resistance;

the first path and the second path are configured to provide a substantially equivalent insertion loss; and the third path is configured to provide an isolation that is less than 30 dB.

22. The splitter of claim 21, wherein the number of the plurality of outputs is less than or equal to 16, and wherein the isolation in the third path is less than 25 dB.

23. The splitter of claim 21, wherein the number of the plurality of outputs is less than or equal to 8, and wherein the isolation in the third path is less than 20 dB.

24. The splitter of claim 21, wherein the number of the plurality of outputs is less than or equal to 4, and wherein the isolation in the third path is less than 15 dB.

25. The splitter of claim 21, wherein the number of the plurality of outputs is less than or equal to 2, and wherein the isolation in the third path is less than 10 dB.

26. A splitter for an in-home network, comprising
an input;
a plurality of outputs including a first output and a second output;
a first path that is configured to extend between the input and the first output;
a second path that is configured to extend between the input and the second output;
a third path that is configured to extend between the first output and the second output;
wherein the input, the first output, and the second output are configured to form a resistive Wye-type splitter so as to provide the first and second paths with separate series resistances;
wherein the first path and the second path are configured to provide a substantially equal series resistance so as to provide substantially uniform isolation;
wherein the first path and the second path are also configured to provide a substantially equivalent insertion loss so as to provide substantially equivalent signal strength in the first and second paths; and
wherein the third path is configured to provide the isolation of less than 30 dB so as to improve the signal strength in the third path.

27. The splitter of claim 26, further comprising a resistor that is configured to be connected to and positioned between the input and a split point, wherein the third path is configured to provide the isolation of less than 30 dB at least partially based upon a resistance value of the resistor.

28. The splitter of claim 26, wherein the number of the plurality of outputs is less than or equal to 16, and wherein the third path is configured to provide the isolation of less than 25 dB.

29. The splitter of claim 26, wherein the number of the plurality of outputs is less than or equal to 8, and wherein the third path is configured to provide the isolation of less than 20 dB.

30. The splitter of claim 26, wherein the number of the plurality of outputs is less than or equal to 4, and wherein the third path is configured to provide the isolation of less than 15 dB.

31. The splitter of claim 26, wherein the number of the plurality of outputs is less than or equal to 2, and wherein the third path is configured to provide the isolation of less than 10 dB.

32. A splitter for an in-home network having an input, a first output, and a second output, the splitter comprising:
a first path that is configured to extend between the input and the first output;
a second path that is configured to extend between the input and the second output;
a third path that is configured to extend between the first output and the second output;
wherein the input, the first output, and the second output are configured to form a resistive Wye-type splitter;
wherein the first path and the second path are configured to provide a substantially equal series resistance;
wherein the first path and the second path are configured to provide a substantially equivalent insertion loss; and
wherein the third path is configured to provide an isolation of less than 30 dB.

33. The splitter of claim 32, wherein the input, the first output, and the second output are configured to form a resistive Wye-type splitter so as to provide the first and second paths with separate series resistances.

34. The splitter of claim 32, wherein the first path and the second path are configured to provide a substantially equal series resistance so as to cause the isolation to be substantially uniform.

35. The splitter of claim 32, wherein the first path and the second path are configured to provide a substantially equivalent insertion loss so as to provide substantially equivalent signal strength in the first and second paths.

36. The splitter of claim 32, wherein the third path is configured to provide an isolation of less than 30 dB so as to improve a signal strength in the third path.

37. A splitter for an in-home network having an input, a first output, and a second output, the splitter comprising:
a first path that is configured to extend between the input and the first output;
a second path that is configured to extend between the input and the second output;
a third path that is configured to extend between the first output and the second output;
wherein the first path and the second path are configured to provide a substantially equal resistance; and
wherein the third path is configured to provide an isolation of less than 30 dB.

38. The splitter of claim 37, wherein the first path and the second path are configured to provide a substantially equal resistance so as to cause the isolation to be substantially uniform.

39. The splitter of claim 37, wherein the first path and the second path are configured to provide a substantially equivalent insertion loss.

40. The splitter of claim 37, wherein the first path and the second path are configured to provide a substantially equivalent insertion loss so as to provide substantially equivalent signal strength in the first and second paths.

41. The splitter of claim 37, wherein the third path is configured to provide an isolation of less than 30 dB so as to improve a signal strength in the third path.

42. The splitter of claim 37, wherein the input, the first output, and the second output are configured to form a resistive Wye-type splitter.

43. The splitter of claim 37, wherein the input, the first output, and the second output are configured to form a resistive Wye-type splitter so as to provide the first and second paths with separate series resistances.

44. A splitter for an in-home network having an input, a first output, and a second output, the splitter comprising:

a first path that is configured to extend between the input and the first output;

a second path that is configured to extend between the input and the second output;

a third path that is configured to extend between the first output and the second output;

wherein the first path and the second path are configured to provide a substantially equal insertion loss; and wherein the third path is configured to provide an isolation of less than 30 dB.

45. The splitter of claim 44, wherein the first path and the second path are configured to provide a substantially equal resistance.

46. The splitter of claim 44, wherein the first path and the second path are configured to provide a substantially equal resistance so as to cause the isolation to be substantially uniform.

47. The splitter of claim 44, wherein the first path and the second path are configured to provide a substantially equivalent insertion loss so as to provide substantially equivalent signal strength in the first and second paths.

48. The splitter of claim 44, wherein the third path is configured to provide an isolation of less than 30 dB so as to improve the signal strength in the third path.

49. The splitter of claim 44, wherein the input, the first output, and the second output are configured to form a resistive Wye-type splitter.

50. The splitter of claim 44, wherein the input, the first output, and the second output are configured to form a resistive Wye-type splitter so as to provide the first and second paths with separate series resistances.

51. A splitter for an in-home network having an input, a first output, and a second output, the splitter comprising:

a first path that is configured to extend between the input and the first output;

a second path that is configured to extend between the input and the second output;

a third path that is configured to extend between the first output and the second output; and wherein the third path is configured to provide an isolation of less than 30 dB.

52. The splitter of claim 51, wherein the first path and the second path are configured to provide a substantially equal resistance.

53. The splitter of claim 51, wherein the first path and the second path are configured to provide a substantially equal resistance so as to cause the isolation to be substantially uniform.

54. The splitter of claim 51, wherein the first path and the second path are configured to provide a substantially equal insertion loss.

55. The splitter of claim 51, wherein the first path and the second path are also configured to provide a substantially equivalent insertion loss so as to provide substantially equivalent signal strength in the first and second paths.

56. The splitter of claim 51, wherein the third path is configured to provide an isolation of less than 30 dB so as to improve a signal strength in the third path.

57. The splitter of claim 51, wherein the input, the first output, and the second output are configured to form a resistive Wye-type splitter.

58. The splitter of claim 51, wherein the input, the first output, and the second output are configured to form a resistive Wye-type splitter so as to provide the first and second paths with separate series resistances.

59. A splitter for an in-home network having an input, a first output, and a second output, the splitter comprising:

first means for transmitting signals between the input and the first output;

second means for transmitting signals between the input and the second output;

third means for transmitting signals between the first output and the second output; and wherein the third means is configured to provide an isolation of less than 30 dB.

60. The splitter of claim 59, wherein the first means and the second means are configured to provide a substantially equal resistance.

61. The splitter of claim 59, wherein the first means and the second means are configured to provide a substantially equal resistance so as to cause the isolation to be substantially uniform.

62. The splitter of claim 59, wherein the first means and the second means are configured to provide a substantially equal insertion loss.

63. The splitter of claim 59, wherein the first means and the second means are configured to provide a substantially equivalent insertion loss so as to provide substantially equivalent signal strength in the first and second means.

64. The splitter of claim 59, wherein the third means is configured to provide an isolation of less than 30 dB so as to improve a signal strength in the third means.

65. The splitter of claim 59, wherein the input, the first output, and the second output are configured to form a resistive Wye-type splitter.

66. The splitter of claim 59, wherein the input, the first output, and the second output are configured to form a resistive Wye-type splitter so as to provide the first and second means with separate series resistances.

* * * * *